United States Patent [19]

Spells

[11] Patent Number: 4,810,748
[45] Date of Patent: Mar. 7, 1989

[54] CONCRETE JOINT SEALANT HAVING IMPROVED ADHESION

[75] Inventor: Sherwood Spells, Midland, Mich.

[73] Assignee: Dow Corning Corporation, Midland, Mich.

[21] Appl. No.: 181,793

[22] Filed: Apr. 15, 1988

[51] Int. Cl.$^4$ ............................................. C08L 83/08
[52] U.S. Cl. ..................................... 524/725; 524/726; 524/773; 524/777; 524/788; 524/864; 524/731
[58] Field of Search ............... 524/864, 588, 725, 726, 524/773, 777, 788, 731

[56] References Cited

U.S. PATENT DOCUMENTS

| | | | |
|---|---|---|---|
| 3,441,583 | 4/1969 | Murphy | 260/448.2 |
| 3,766,127 | 10/1973 | Clark et al. | 260/37 |
| 3,776,933 | 12/1973 | Toporcer et al. | 260/448.2 |
| 3,776,934 | 12/1973 | Toporcer et al. | 260/448.2 |
| 3,817,909 | 6/1974 | Toporcer et al. | 260/37 |
| 3,996,184 | 12/1976 | Klosowski | 260/32.6 |
| 4,323,489 | 4/1982 | Beers | 524/864 |
| 4,528,324 | 7/1985 | Chung | 524/864 |

*Primary Examiner*—C. Warren Ivy
*Attorney, Agent, or Firm*—Edward C. Elliott

[57] ABSTRACT

A silicone sealant composition which bonds to dolomite containing concrete after exposure to moisture is obtained by adding a silicone fluid having greater than 2 mole percent epoxy functionality to a sealant of the type containing a hydroxyl endblocked polydiorganosiloxane, acetamidosilane chain extender, and crosslinking agent selected from the group consisting of triacetamidosilane and aminoxysilicon compound.

9 Claims, No Drawings

CONCRETE JOINT SEALANT HAVING IMPROVED ADHESION

BACKGROUND OF THE INVENTION

1. Field of the Invention

This invention relates to highway sealants which are self leveling when applied and which bond to dolomite containing concrete when exposed to water immersion.

2. Background Information

Concrete highways are subjected to expansion and contraction forces which require that joints be placed in the construction to allow for expansion and contraction. The joint must be sealed or filled so that water can not fill the joint and then break the concrete when it freezes and expands. The joint must be filled so that it does not become filled with rocks, which would also cause the concrete to break when the joint narrows due to expansion of the concrete from weather changes.

Among the means used to fill the joints to keep out rocks have been molded elastomeric forms and poured or injected thermoplastic and/or elastomeric filling materials. When the roadway expands or contracts, these materials or devices allow the joint to become narrower or wider without subjecting the concrete to high physical forces. The simplest joint filler has been the use of hot melt asphalt. This functions at first, but fails due to hardening from aging or lowering of temperatures. More elaborate solutions have been molded elastomeric devices and the use of elastomers, such as polyurethanes and silicones, as joint filling materials.

U.S. Pat. No. 3,766,127, issued Oct. 16, 1973, teaches a low modulus room temperature vulcanizable silicone elastomer. The composition is based upon an acetamido containing chain extender and crosslinker in combination with a hydroxyl endblocked polydiorganosiloxane. When fillers are used in the composition it is useful as a sealant.

U.S. Pat. No. 3,817,909, issued June 18, 1974, teaches a low modulus room temperature vulcanizable silicone elastomer is obtained by mixing a hydroxyl endblocked polydiorganosiloxane, non-acidic, non-reinforcing filler, acetamido containing chain extender and crosslinker which is an aminoxysilicon compound having 3 to 10 aminoxy groups per molecule. The sealant is useful in building construction.

U.S. Pat. No. 3,996,184, issued Dec. 7, 1976, teaches a one package, low modulus, room temperaure vulcanizable silicone elastomer composition having improved slump characteristics at low temperatures. This composition is obtained by mixing a hydroxyl endblocked polydimethylsiloxane, non-acidic, non-reinforcing filler, methylvinyldi-(N-acetamido)silane, an aminoxysilicon compound having 3 to 10 aminoxy groups per molecule, and a diluent selected from N,N-dimethylformamide, acetonitrile, or N-n-butylacetamide. The elastomer is useful in building construction.

The sealant of this invention was developed to provide good bonding to dolomite containing concrete even when exposed to water immersion.

SUMMARY OF THE INVENTION

A silicone sealant composition which bonds to dolomite containing concrete even after exposure to water is obtained by combining a hydroxyl endblocked polydiorganosiloxane, optionally a filler, acetamidosilane chain extender, crosslinking agent, optionally a particular solvent, and a silicone fluid having greater than 2 mole percent epoxy functionality, the epoxy functionality being present as endblocking or side chains of the formula

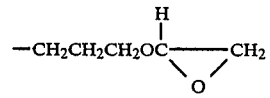

in the required proportions.

DESCRIPTION OF THE INVENTION

This invention relates to a composition which is stable in the absence of moisture but curable at room temperature upon exposure to moisture to a silicone elastomer consisting essentially of a mixture prepared by mixing under anhydrous conditions (A) 100 parts by weight of a hydroxyl endblocked polydiorganosiloxane having a viscosity at 25° C. of from 1.8 to 125 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals; (B) from 0 to 150 parts by weight of non-acidic, non reinforcing filler; (C) from 2.5 to 10 parts by weight of a silane of the general formula

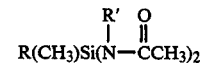

in which R is an organic radical selected from the group consisting of methyl and vinyl and R' is an organic radical selected from the group consisting of methyl, ethyl, and phenyl, said silane being present in an amount sufficient to provide at least one silane molecule per hydroxyl of the polydiorganosiloxane; (D) a crosslinking agent selected from the group consisting of 0.3 to 4.2 parts by weight of a trifunctional silane of the general formula

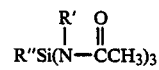

in which R' is defined above and R" is the same as R, at least one of R and R" being vinyl; and 1 to 6 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine, R is a monovalent hydrocarbon radical, the —OX group being bonded to silicon atoms through an SiO bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom; and (E) from 0.25 to 10 percent by weight of the total composition of an epoxy functional silicone fluid having greater than 2 mole percent epoxy functionality, the epoxy functionality being present as endblocking or side chains of the formula

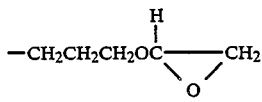

said silane (C) and said crosslinking agent (D) being present in amounts sufficient to provide a combined weight of at least 5 parts by weight per 100 parts by weight of (A), and said crosslinking agent (D) being present in an amount which is not greater than the weight of the silane (C), said composition when cured for seven days at 25° C. exposed to an air atmosphere having 50 percent relative humidity resulting in a silicone elastomer having an elongation of at least 600 percent, a durometer on the Shore A scale of from 5 to 20 inclusive and a modulus at 150 percent elongation of less than 50 pounds per square inch.

One of the materials commonly used for aggregate in concrete in some locations is dolomite (MgCa(CaCO$_3$)$_2$). It has been found that, when the concentration of dolomite is greater than 50 percent of the aggregate, the adhesion of silicone joint sealant to the concrete fails under prolonged wet or damp conditions. An improved sealant has been developed which provides adhesion to dolomite and dolomite containing concrete, even under conditions of prolonged water immersion by including in the sealant formulation an epoxy functional silicone fluid. The epoxy functional silicone fluid is of the general formula, R$_3$SiO(R$_2$SiO)$_x$SiR$_3$, where R is selected from the group consisting of methyl, ethyl, propyl, vinyl, phenyl, and the epoxy group of the formula

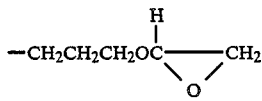

with the requirement that at least 2 mole percent of the R groups be the epoxy group, and x is from 10 to about 125. The epoxy groups can be present as endblocking groups or as side chain groups or as both. It is preferred that the epoxy groups be present at greater than 5 mole percent. The epoxy groups must be present as part of a silicone fluid such as shown above. If the epoxy groups are present in the form of the well known epoxy functional alkoxysilanes used to improve adhesion of organic resins as well as many other types of adhesives, the cure of the sealant is interfered with to the point that the sealant is no longer useful.

The epoxy functional silicone fluid can be prepared by reacting an alkylhydrogenpolysiloxane of the desired molecular weight and hydrogen on silicon content with an excess of allylglycidyl ether in the presence of a platinum catalyst, to replace the hydrogen on silicon with an allylglycidyl group. The reaction product is than stripped to give the desired epoxy functional silicone fluid. The alkylhydrogenpolysiloxane is prepared by the well known acid catalysis and polymerization of mixtures of alkylhydrogencyclosiloxane, dialkylcyclosiloxane, and endblocker of hexaalkyldisilane or tetraalkyldihydrogendisilane.

The hydroxyl endblocked polydiorganosiloxanes (A) can have a viscosity at 25° C. of from about 1.8 to 125 Pa.s, preferably from 3.5 to 70 Pa.s. These polydiorganosiloxane can be monodispersed, polydispersed, or blends of varying viscosities as long as the average viscosity falls within the limits defined above. The hydroxyl endblocked polydiorganosiloxanes have organic groups selected from methyl, ethyl, vinyl, phenyl and 3.3.3-trifluoropropyl radicals. The organic groups of the polydiorganosiloxane contain no more than 50 percent phenyl or 3,3,3-trifluoropropyl radicals and no more than 10 percent vinyl radicals based upon the total number of radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane ethylmethylsiloxane, diphenylsiloxane, methylphenylsiloxane, methylvinylsiloxane, and 3,3,3-trifluoropropylmethylsiloxane. The term polydiorganosiloxane as used herein does not preclude small amounts of other siloxane units such an monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The compositions of this invention contain from 0 to 150 parts by weight of non-acidic, non-reinforcing filler having an average particle size of from 1 to 8 micrometers per 100 parts by weight of hydroxyl endblocked polydiorganosiloxane. The fillers are non-acidic, non-reinforcing filler and include for example, calcium carbonate, ferric oxide, diatomacious earth, alumina, hydrated alumina, titanium dioxide, glass microballons, organic fillers, resins such as silicone resins, crushed quartz, calcium sulfate, and the like. A preferred filler is calcium carbonate having an average particle size of less than 4 micrometers.

If desired, the composition of this invention can be made self-leveling by use of a mixture of treated and untreated filler. To obtain self leveling, from 95 to 5 percent by weight of the filler is present as untreated filler, and from 5 to 95 percent by weight of the filler is present as treated filler, along with from 1 to 50 percent by weight of a diluent, based upon the weight of the total composition. If from 40 to 100 percent of the filler is treated, a self leveling filler can be produced without the use of diluent.

The treated filler is treated with a treating agent selected from the group consisting of calcium stearate and stearic acid. The filler is treated with the treating agent by either coating or reacting the filler with the treating agent. Treated fillers are commercially available, such as the calcium carbonate filler treated with calcium stearate that is known as CS-11 from Georgia Marble Company of Tate, Ga., and Kotamite from Cyprus Industrial Minerals Company of Englewood, Colo.

The silane (C) of the general formula

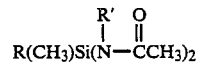

in which R is an organic radical selected from the group consisting of methyl, ethyl, vinyl, and phenyl, and R' is an organic radical selected from the group consisting of methyl, ethyl, and phenyl, reacts with the hydroxyl endblocked polydiorganosiloxane to give a longer polymer. The longer polymer gives a tougher, lower modulus material that is ideal for this type of application. The silanes include, for example, methylvinyldi-(n-methylacetamido)silane, and methylvinyldi(N-phenylcetamido)silane. A preferred silane (C) is methylvinyldi-(N-methylacetamido)silane. These amidosilanes can be prepared by reacting a chlorosilane with an alkali metal salt of an appropriate N-organoacetamide. This method is further detailed in U.S. Pat. No. 3,776,933, issued Dec. 4, 1973 by Toporcer and Crossan, and hereby incorporated by reference for the preparation of the amidosilanes.

The amidosilanes can be prepared as by the following illustration: mixing a sodium salt of N-methylacetamide with methylvinyldichlorosilane in an inert organic solvent such as toluene, filtering the by-produced sodium chloride from the toluene-product solution, and thereafter removing the toluene by vacuum distillation to obtain the product, methylvinyldi(N-methylacetamido)silane.

The crosslinking agent (D) is selected from the group consisting of 0.3 to 4.2 parts by weight inclusive of a triamidosilane of the general formula

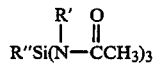

in which R' is defined above and R" is the same as R, at least one of R and R" being vinyl; and 1 to 6 parts by weight inclusive of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine, R is a monovalent hydrocarbon radical, the —OX group being bonded to silicon atoms through an SiO bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom.

The triamidosilane of the general formula

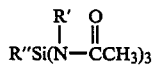

reacts with the hydroxyl endblocked polydiorganosiloxane to crosslink the polymer and so produced an elastomer. R' is defined above and R" is the same as R. These triamidosilanes include, for example, methyltri-(N-methylacetamido)silane, vinyltri-(N-methylacetamido)silane, methyltri-(N-ethylacetamido)silane, vinyltri-(N-ethylacetamido)silane, methyltri-(N-phenylacetamido)silane, and vinyltri-(N-phenylacetamido)silane. These triamidosilanes can be prepared by reacting the appropriate chlorosilane with an alkali metal salt of an appropriate N-organoacetamide, as further detailed in U.S. Pat. No. 3,776,933, issued Dec. 4, 1973, and U.S. Pat. No. 3,776,934, issued Dec. 4, 1973, both patents hereby being incorporated by reference to show methods of preparation of amidosilanes. A preferred triamidosilane is methyltri-(N-methylacetamido)silane.

The aminoxysilicon compounds used as crosslinking agents can be silicon compounds having from 1 to 100 silicon atoms per molecule in which there are from 3 to 10 aminoxy groups per molecule. The aminoxysilicon compounds can be prepared by the method shown in U.S. Pat. No. 3,441,583, issued Apr. 29, 1969, which also illustrates many aminoxysilicon compounds, and which is hereby incorporated by reference to show the manufacture of aminoxysilicon compounds. The aminoxy silicon compounds include silanes and siloxanes. The aminoxy group which is bonded to the silicon atoms through silicon-oxygen bonds can be represented by the general formula —OX wherein X is a monovalent amine radical of the group—NR$_2$ and heterocyclic amine. R represents a monovalent hydrocarbon radical. The —NR$_2$ groups can be represented by N,N-diethylamino, N,N-ethylmethylamino, N,N-dimethylamino, N,N-diisopropylamino, N,N,-dipropylamino, N,N,-dibutylamino, N,N,-dipentylamino, N,N,-hexylamino N,N,-dibutylamino, N,N-methylpropylamino, N,N,-diphenylamino, and N,N,-methylphenylamino. The heterocyclic amines can be illustrated by ethyleneimino, pyrrolidino, piperidino, and morpholino. Additional aminoxysilicon compounds can be found in U.S. Pat. No. 3,996,184, issued Dec. 7, 1976, which is hereby incorporated by reference to show aminoxysilicon compounds. A preferred aminoxysilicon compound is a copolymer having per molecule an average of two trimethylsiloxane units, five methyl(N,N-diethylaminoxy)siloxane units and three dimethylsiloxane units.

The amount of amidosilane (C) can be from 2.5 to 10 parts by weight per 100 parts by weight of polydiorganosiloxane. The most preferred compositions have from 4 to 8 parts by weight. When the amount of amidosilane is less than 2.5 parts, the resulting composition cures to a silicone elastomer with sufficiently higher modulus so that it would no longer be classified as a low modulus silicone elastomer. No advantages are experienced in exceeding 10 parts by weight because slower cures and less desirable physical properties are observed.

When the crosslinking agent selected is a triamidosilane, the amount of triamidosilane can be from 0.3 to 4.2 parts by weight per 100 parts by weight of the hydroxyl endblocked polydiorganosiloxane, preferably from 1 to 1.75 parts by weight when amidosilane (C) is present in an amount of from 5 to 8 parts by weight.

When the crosslinking agent selected is aminoxysilicon compound, the amount of aminoxysilicon compound can be from 1 to 6 parts by weight per 100 parts by weight of hydroxyl endblocked polydiorganosiloxane. The preferred amount of aminoxysilicon compound is dependent to some extent upon the viscosity of the hydroxyl endblocked polydiorganosiloxane. The larger amounts of aminoxysilicon compound are preferably used with the higher viscosity polydiorganosiloxane. If the amount of aminoxysilicon compound exceeds 6 parts, the resulting cured products are high modulus silicone elastomers. The preferred amount of aminoxysilicon compound is from 2 to 4 parts. However, the amount of aminoxysilicon compound regardless of viscosity should not exceed the weight of the amidosilane (C) and the combined weight of amidosilane (C) and aminoxysilicon compound (D) should be greater than 5 parts. Amounts of aminoxysilicon compound exceeding the weight of silane (C) result in cured products having high modulus.

The compositions of this invention may contain from 0 to 50 percent by weight of a diluent, based upon the weight of the total composition. This diluent is added to the formulation in order to assist in obtaining a self leveling sealant. By self leveling is meant the ability to flow under the force of gravity so that when the sealant is extruded into a pavement joint, for example, the sealant will flow enough to completely contact the sides of the joint and form a firm bond. The diluent is selected from the group consisting of non-reactive silicone fluid and organic diluent. The non-reactive silicone fluid can be a homopolymer of R''$_2$SiO units where R'' is methyl, ethyl, propyl, phenyl, vinyl, or 3,3,3,trifluoropropyl, and R'' can be the same or different in each unit. The end blocking unit of the silicone diluent can be R''$_3$SiO where R'' is as described above. Preferably, the viscosity of the silicone diluent is from 0.02 to 1 Pa.s, with from 0.02 to 0.1 most preferred. Less of the diluent can be used when the lower range of viscosity is selected. The organic diluent is selected from the group consisting of aliphatic petroleum naphthas, such as mineral spirits and VM&P naphtha, represented by the petroleum naphtha having a flash point of about 100° F. and sold as Kwick Dry; aromatic hydrocarbons, such as the solvent having a boiling point of about 360° F. and a flash point of about 150° F. and sold as SC 150; and polyethers containing less than 1 percent hydroxyl groups, such as the polyether having a flash point of about 140° F. and sold as Ansul 141. Chlorinated hydrocarbons, such as chlorothene, are unsuitable because they inhibit the cure. It is recommended that any organic diluent chosen by evaluated at the desired use level in the composition to make sure that the composition will still cure properly. For example, when 210 parts of the aromatic solvent SC 150 was used to dilute 1000 parts of base composition, the resulting sealant did not cure properly, but the cure was satisfactory when half of this amount of this diluent was used. A preferred amount of diluent is from 5 to 25 percent of diluent based upon the total weight of the composition.

Other conventional additives can be used so long as they are neutral or basic, including pigments, dyes, antioxidants, heat stability additives, and the like.

The compositions are preferably made by mixing the hydroxyl endblocked polydiorganosiloxane and filler to make a homogeneous mixture with the filler well dispersed. A suitable mixture can usually be obtained in one hour using commercial mixers. The resulting mixture is preferably deaired and then a mixture of the amidosilane and crosslinking agent is added and mixed with the polymer and filler mixture. The epoxy functional silicone fluid can be added either before or along with or after the addition of amidosilane and crosslinking agent. This mixing is done under essentially anhydrous conditions and then the resulting composition is put into containers for storage under essentially anhydrous conditions. Once one package compositions are made, they are stable, that is they do not cure, if the essentially moisture free conditions are maintained, but will cure to low modulus silicone elastomers when exposed to moisture at room temperature. The diluent can be mixed into the composition in any manner and at any time during the preparation, but it is preferred to add it after the polymer and filler have been mixed as a better filler dispersion takes place. Although the present compositions are designed as one package compositions, the commponents could be packaged in two or more packages, if desired.

The compositions of this invention, after cure by exposure to air atmosphere for seven days at 25° C. and 50 percent relative humidity, have an elongation of at least 600 percent, a durometer on the Shore A scale of from 5 to 20, and a modulus at 150 percent elongation of less than 50 pounds per square inch. These requirements insure that the seal formed by this composition will not be broken by the thermally caused movement of a highway during exposure to extremes in temperature differences.

The compositions of the present invention do not require a catalyst to aid in curing the composition and it is observed that many of the conventional curing catalysts used in room temperature vulcanizable silicone elastomer compositions are detrimental to the curing of the compositions.

The following examples are included for illustrative purposes only and should not be construed as limiting the invention which is properly set forth in the appended claims. All parts are parts by weight.

A number of epoxy functional fluids having varying mole percents of epoxy group were prepared. First a series of polydimethyl(methylhydrogen)siloxanes were prepared by the acid catalysis and polymerization of mixtures of methylhydrogencyclotetrasiloxane, dimethylcyclotetrasiloxane, and tetramethyldisilane. After polymerization to the desired molecular weight, the reaction products were neutralized and stripped to give a series of SiH containing polydiorganosiloxanes of varying molecular weight and SiH content. These fluids were then reacted with an excess of allylglycidyl ether in the presence of a platinum catalyst to give an epoxy functional radical in place of the hydrogen on silicon. These reaction products were then stripped to give the desired adhesion additives. The adhesion additives produced were characterized and found to have the formulations:

| Additive | Formulation | Mole Percent Epoxy |
|---|---|---|
| a | Me$_3$—SiO(SiO)$_{90}$(SiO)$_8$Si—Me$_3$ with Me, Me, Me, A, Me substituents | 8 |
| b | A—SiO(SiO)$_{98}$Si—A with Me, Me, Me substituents | 2 |
| c | A—SiO(SiO)$_{40}$(SiO)$_4$Si—A with Me, Me, A, Me substituents | 13 | where Me is the methyl radical and A is the radical

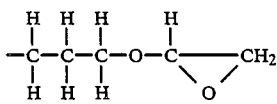

These epoxy functional silicone fluids were then used as adhesion additives in the following examples.

EXAMPLE 1

An alkoxy functional sealant base was prepared by mixing 42 parts of hydroxyl endblocked polydimethylsiloxane fluid having a viscosity of about 50 Pa.s at 25° C. and a hydroxyl content of about 0.057 weight percent with 53 parts of calcium carbonate filler having an average particle size of about 3 micrometers. After thorough mixing and deairing, the base was mixed in the absence of moisture with 1.4 parts of aminoxy-functional crosslinker which was a copolymer having per molecule an average of two trimethylsiloxane units, five methyl(N,N-diethylaminoxy)siloxane units, and three dimethylsiloxane units, and 3.3 parts of chain extender consisting of about 80 percent by weight of methylvinyldi(N-methylacetamido)silane with the remaining 20 percent being impurities, consisting primarily of unreacted ingredients and xylene.

Sealant samples were then prepared by adding 1 percent by weight of the above adhesion additives to the above base as shown in Table I.

TABLE I

| Adhesion additive | none | a | c | none | a | c | none |
|---|---|---|---|---|---|---|---|
| Stone Composition | A | A | A | B | B | B | C |
| Adhesion | 1 | 3 | 2 | 1 | 2 | 3 | 3 |

Adhesion additive a is

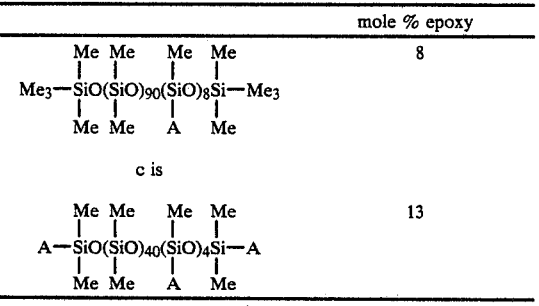

c is where Me is the methyl radical and A is the radical

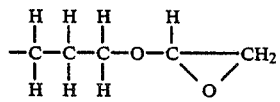

| Adhesion | 1 is complete adhesive failure |
| | 2 is partial adhesive failure |
| | 3 is good adhesion |

| Stone Composition | A | B | C |
|---|---|---|---|
| Dolomite | 65 | 75 | 40 |
| Calcite | 5 | 2 | 55 |
| Quartz | 30 | 10 | 5 |

EXAMPLE 2

A series of sealants were prepared as in Example 1, but using different amounts of additive c, as shown in Table II. These sealants were then evaluated by means of a tab adhesion test. A bead of sealant was laid down on the surface of test blocks cut from 100 percent dolomite between two shims, The bead was allowed to cure for 7 days at room temperature and humidity, then was evaluated by peeling the bead away from the surface at 180°. The amount of cohesive failure at the surface was then judged. A good adhesive fails by cohesive failure. Additional samples were exposed to 7 days immersion in water and then tested without allowing to dry. The results are shown in Table II.

TABLE II

| Amount of additive percent | Percent 7 day | Cohesive Failure 7 days plus 7 days water immersion |
|---|---|---|
| 0 | 100 | 0 |
| 0.5 | 100 | 100 |
| 1.0 | 100 | 100 |
| 2.5 | 100 | 100 |

EXAMPLE 3

A series of sealants were prepared as in Example 1, but using additives a and c in the amounts shown in Table III. The sealants were evaluated by bonding test blocks of concrete A or concrete B together with a ½ by ½ by 2 inch bead of sealant, curing the sealant, exposing the test sample to 7 days immersion in water, followed by 22 days immersion in lime water. The blocks were them pulled apart and the elongation of the sealant that occurred before failure of the sealant was measured, with the results shown in Table III.

TABLE III

| Additive | Additive Parts | Elongation at Failure Percent |
|---|---|---|
| | | Concrete A |
| | 0* | 130 |
| c | 1 | 790 |
| | 5 | 810 |
| a | 1 | 387 |
| | 5 | 522 |
| | | Concrete B |
| | 0* | 296 |
| c | 5 | 790 |
| a | 5 | 438 |

*comparative example

The elongation before failure of the sealant was much greater for those compositions containing either additive a or additive c, when compared to a sealant having no additive.

That which is claimed is:

1. A composition which is stable in the absence of moisture but curable at room temperature upon exposure to moisture to a silicone elastomer consisting essentially of a mixture prepared by mixing under anhydrous conditions (A) 100 parts by weight of a hydroxyl endblocked polydiorganosiloxane having a viscosity at 25° C. of from 1.8 to 125 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) from 0 to 150 parts by weight of non-acidic, non reinforcing filler, (C) from 2.5 to 10 parts by weight of a silane of the general formula

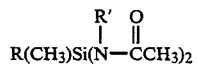

in which R is an organic radical selected from the group consisting of methyl and vinyl and R' is an organic radical selected from the group consisting of methyl, ethyl, and phenyl, said silane being present in an amount sufficient to provide at least one silane molecule per hydroxyl of the polydiorganosiloxane, (D) a crosslinking agent selected from the group consisting of 0.3 to 4.2 parts by weight of a trifunctional silane of the general formula

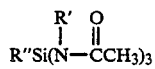

in which R' is defined above and R" is the same as R, at least one of R and R" being vinyl; and 1 to 6 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine radical, R is a monovalent hydrocarbon radical, the —OX group being bonded to silicon atoms through an SiO bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, and (E) from 0.25 to 10 percent by weight of the total composition of an epoxy functional silicon fluid of the general formula, $R_3SiO(R_2SiO)_xSiR_3$, where R is selected from the group consisting of methyl, ethyl, propyl, vinyl, phenyl, and the epoxy group of the formula

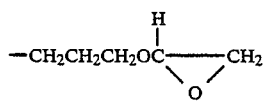

with the requirement that at least 2 mole percent of the R groups be the epoxy group, and x is from 10 to about 125; said silane (C) and said crosslinking agent (D) being present in amounts sufficient to provide a combined weight of at least 5 parts by weight per 100 parts by weight of (A), and said crosslinking agent (D) being present in an amount which is not greater than the weight of the silane (C), said composition when cured for seven days at 25° C. exposed to an air atmosphere having 50 percent relative humidity resulting in a silicone elastomer having an elongation of at least 600 percent, a durometer on the Shore A scale of from 5 to 20 inclusive and a modulus at 150 percent elongation of less than 50 pounds per square inch.

2. The composition of claim 1 in which (E) is of the formula

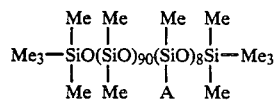

where Me is methyl, and A is

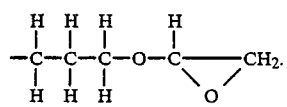

3. The composition of claim 1 in which (E) is of the formula

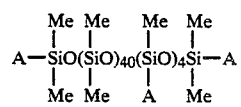

where Me is methyl and A is

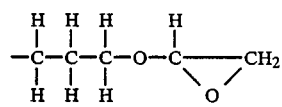

4. The composition of claim 1 in which (B) is from 1 to 150 parts by weight of non-acidic, non reinforcing filler having an average particle size of from 1 to 8 micrometers, said filler consisting of from 95 to 5 percent by weight of an untreated filler and from 5 to 95 percent by weight of a treated filler, said treated filler having been treated with a treating agent selected from the group consisting of calcium stearate and stearic acid.

5. The composition of claim 1 in which there is also present from 1 to 5 parts by weight of a polar solvent selected from the group consisting of N,N,-dimethylformamide, acetonitrile, and N-n-butylacetamide.

6. The composition of claim 1 in which there is also present from 1 to 50 percent by weight of the total composition of a diluent selected from the group consisting of non-reactive silicone fluid and organic diluent, said organic diluent selected from the group consisting of aliphatic petroleum naphthas, aromatic hydrocarbons, and polyethers having less than 0.5 hydroxyl groups.

7. The composition of claim 1 in which the polydiorganosiloxane (A) is a polydimethylsiloxane having a viscosity of about 50 Pa.s at 25° C., the filler (B) is a calcium carbonate, the silane (C) is methylvinyldi(N-methylacetamido)silane, and the crosslinking agent (D) is copolymer having per molecule an average of two trimethylsiloxane units, five methyl(N,N-diethylaminoxy)siloxane units, and three dimethylsiloxane units.

8. The composition of claim 2 in which the polydiorganosiloxane (A) is a polydimethylsiloxane having a viscosity of about 50 Pa.s at 25° C., the filler (B) is a calcium carbonate, the silane (C) is methylvinyldi(N-methylacetamido)silane, and the crosslinking agent (D)

is copolymer having per molecule an average of two trimethylsiloxane units, five methyl(N,N-diethylaminoxy)siloxane units, and three dimethylsiloxane units.

9. The composition of claim 3 in which the polydiorganosiloxane (A) is a polydimethylsiloxane having a viscosity of about 50 Pa.s at 25° C., the filler (B) is a calcium carbonate, the silane (C) is methylvinyldi(N-methylacetamido)silane, and the crosslinking agent (D) is copolymer having per molecule an average of two trimethylsiloxane units, five methyl(N,N-diethylaminoxy)siloxane units, and three dimethylsiloxane units.

* * * * *